April 16, 1968     L. L. HINK     3,378,002

SEMI-PORTABLE FIREPLACE AND GRILL

Filed April 6, 1966

INVENTOR.
LESTER L. HINK
BY Merchant & Gould
ATTORNEYS

United States Patent Office 3,378,002
Patented Apr. 16, 1968

3,378,002
SEMI-PORTABLE FIREPLACE AND GRILL
Lester L. Hink, 605 7th Ave. NE.,
Grand Rapids, Minn. 55744
Filed Apr. 6, 1966, Ser. No. 540,537
3 Claims. (Cl. 126—25)

My invention relates generally to fire control or confining devices, such as fireplaces, and more particularly to semi-portable fireplaces and barbecue grills for outdoor use in such places as back yards, public parks, and camping grounds.

Due to the ever increasing popularity of camping, picnicking, and barbecuing of food out-of-doors, an increased amount of accidental fires have occurred. To alleviate this problem, fire control or confining devices are provided in most public places to contain campfires utilized for out-of-doors cooking of foods even though such fires may be left unattended for a short period or left entirely upon departure. A good many of such fireplaces are not only relatively fixed structures, making the same hard to clean or service and virtually impossible to store during long periods of disuse, but are frequently quite expensive both to construct and repair. Devices of this nature are readily susceptible to damage due to the elements, such as water, which may collect in the firepot of a fireplace and either freeze during the winter months or render the device inoperable during the summer months, or to vandalism during both periods of use or disuse.

It is therefore a primary object of my invention to produce a device of the class above described which will efficiently control or confine fires set therein.

It is another object of my invention to produce a device of the class described which is semi-portable whereby the same may be easily cleaned or repaired on the spot or alternately moved to another site for repairs, storage, or relocation.

A further object of my invention is the provision of a semi-portable fireplace ring and barbecue grill which is extremely simple and inexpensive to produce and which is rugged and durable in use.

A still further object of my invention is the provision of a semi-portable fireplace ring and barbecue grill in which the grill thereof is vertically adjustable.

These and other highly important objects will become apparent to those skilled in the art upon consideration of the following detailed specification, attached drawings, and appended claims.

Referring to the drawings wherein like reference numerals indicate like parts throughout the several views.

Figure 1:
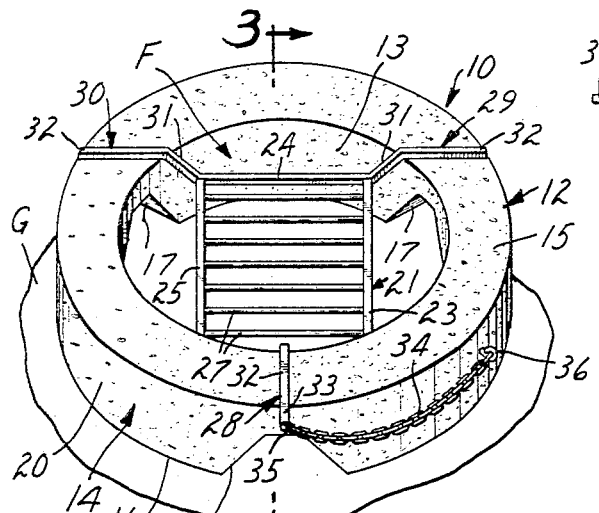
FIG. 1 is a view in perspective of a semi-portable fireplace ring and barbecue grill constructed in accordance with my invention.
Figure 2:
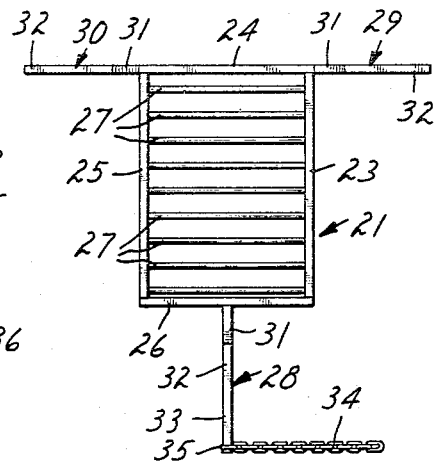
FIG. 2 is a top plan view of the barbecue grill of FIG. 1.

Referring with greater particularity to the drawings, there is shown a semi-portable fireplace indicated in its entirely by the numeral 10. Fireplace 10 is shown as preferably being constructed of a fire resistant concrete material in the form of a generally cylindrical ring-like firepot element 12 which defines a central opening 13 extending therethrough along a vertical axis. Firepot element 12 is formed to provide relatively thick wall 14 which has an upper end 15 and a lower end 16. The lower end 16 of wall 14 is adapted to engage the ground G and forms therewith a firepot F for the reception of charcoal, wood, or other combustible material, not shown.

To provide a suitable draft, for proper combustion of material placed in the firepot F, wall 14 is formed with a plurality of circumferentially spaced, inverted, V-shaped notches 17 which open downwardly through the lower end 16. Notches 17 extend radially through the wall 14 and provide for egress of water, which may accumulate within the firepot F, as well as ingress of oxygen-carrying air to the combustible material within firepot F.

Figure 3:
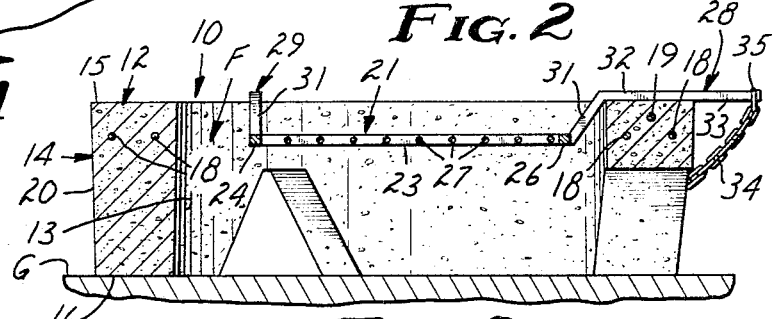
FIG. 3 is a view in vertical section as seen from the line 3—3 of FIG. 1, on a slightly enlarged scale.
Figure 4:
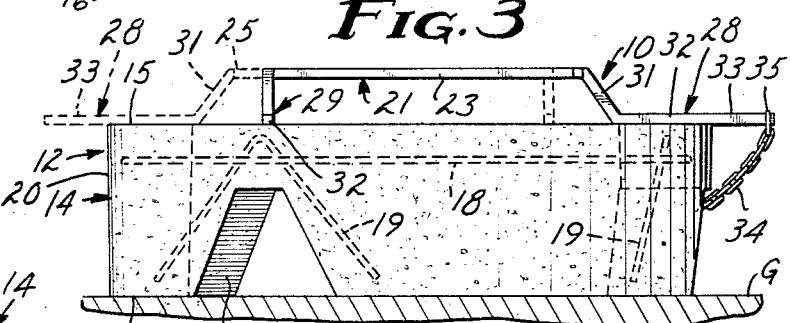
FIG. 4 is a slightly enlarged view in side elevation of the structure of FIG. 1, as seen from left to right, showing a different position of some of the parts thereof.
Figure 5:
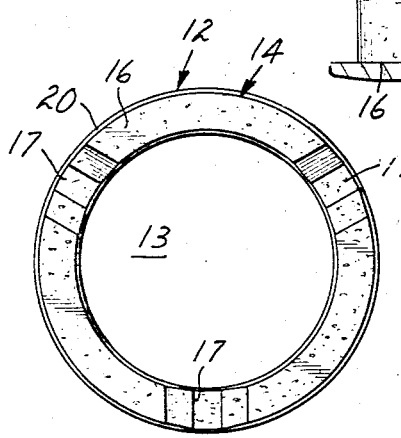
FIG. 5 is a bottom plan view of the fireplace ring shown in FIG. 1 on a slightly reduced scale.

It will be noted by reference to FIGS. 3, 4 that wall 14 of firepot element 12 is provided with reinforcing rods 18, 19. Two reinforcing rods 18 extend circumferentially of the element 12 while rods 19 are formed to encompass one each one of the notches 17. Thus, the firepot element 12 is adequately strengthened to permit tipping of same on the side wall surface 20 of wall 14 whereby the fireplace 10 may be rolled to a more desirable location or alternately to a place of storage during the winter months where likelihood of damage, due to the elements or acts of vandalism, is greatly minimized. The ability to easily load the firepot element 12 on a vehicle, not shown, by rolling same on the side wall surface 20, also allows for repair of such fireplaces 10 at central repair stations remote from their place of use.

A grill element 21 is formed of a generally rectangular grill portion having the side edges 23–26 and spaced bars 27 which extend between the side edges 23, 25. The side edges 23–26 are of a combined peripheral dimension whereby grill element 22 may be received within the central opening 13 of the firepot elements so as to permit positioning of the grill element 21 relatively close to a bed of coals in the firepot F.

Supporting the grill element 21 in the above position and forming a tripod therewith is a plurality of legs 28–30. Each of the legs 28–30 include inner end portions 31 which are secured to the peripheral side edge of the grill element 21. That is, inner end portion 31 of leg 28 is secured to the intermediate portion of side edge 26 while inner ends 31 of legs 29, 30 are one each secured to side edge 24 at its point of juncture with side edges 23, 25. Legs 28–30 also each include outer end portions 32, all of which like in a common plane that is offset but parallel to the plane of the rectangular portion of grill element 21 in a direction axially with respect to the central opening 13 when the outer end portions 32 of legs 28–30 are in engagement with the upper edge 15 of firepot element 12, as shown particularly in FIGS. 1, 3 and 4. Such an arrangement of the legs 28–30 permits supporting of the grill element 21 within the central opening 13 of firepot F, as shown particularly in FIGS. 1, 3, if the heat of the coals, not shown, is of a temperature to permit such close proximity of the grill element 21. Alternately, should the temperature of the coals be too hot, grill element 21 may be moved vertically to the raised position overlying the central opening 13, as shown in FIG. 4.

For the purpose of adjusting the grill element, as above indicated, from the position of FIGS. 1, 3 to that of FIG. 4 or vice versa, leg element 28 is axially extended beyond the side wall 14 of firepot element 12 to form a handle portion 33. When desired, an operator may easily grasp the handle portion 33 and after lifting the grill element 21 vertically rotate same about the axis of the handle portion 33. Should the grill element 21 be of a size wherein it would be difficult, if not impossible, for an operator to lift same, an alternate procedure for adjustment would be to pivot the grill element 21 about the axis of the outer ends 32 of legs 29, 30, slide the legs 29, 30 along the upper end 15 of firepot F and place the leg 28 on the upper end 15 at a point diametrically opposite that shown by full lines in FIGS. 1, 3 and 4, and by dotted lines of FIG. 4. It will be noted that legs 29, 30 are formed as extensions of the side edge 24 with the outer end portions 32 thereof parallel but offset with respect thereto, as above described. Thus, the leg portions 32 of legs 29, 30 act as trunnions to accomplish the last described operation of vertical adjustment of grill element 21 with a minimum of effort.

To assure against loss of the grill element 21, due to theft by vandals, a flexible tie means is provided in the nature of a link chain 34. Chain 34 has one end secured to the handle portion 33 of leg 28 as at 35 and the other end to wall 14 as at 36. While a rather short tie element is shown in the drawings, it will be appreciated that in a larger model fireplace 10, wherein the grill element 21 must be pivoted about the axes of the legs 29, 30, a longer chain 34 must be provided to permit free travel of the leg 28 diametrically across the firepot element 12.

It will be further noted that the firepot element 12 is shown and described as of concrete construction only in that such construction provides a better insulation to contain the heat within the firepot F and may be constructed of any fire resistant material, an example being sheet steel. Therefore, I intend to be limited only to that which comes within the scope of the appended claims.

My invention has been thoroughly tested and found to be completely satisfactory for the accomplishment of the above objects, and while I have shown and described a preferred embodiment, I wish it to be specifically understood that the same is capable of modification without departure from the spirit and scope of the appended claims.

What is claimed is:
1. A semi-portable fireplace and grill for use out-of-doors comprising:
   (a) a generaly cylindrical firepot element defining a central opening extending therethrough on a vertical axis, said firepot element having a side wall which includes an upper end and lower end the latter of which is adapted to engage the ground and form therewith a firepot;
   (b) draft passage means extending radially through said wall adjacent said lower end;
   (c) a grill element of a peripheral dimension to be received within said central opening; and
   (d) means carried by said grill element and supporting same from said upper end for vertical adjustment from a position wherein said grill element is received within said central opening in vertical spaced relation to the ground thereunder to a position wherein said grill element overlies said central opening;
   (e) said last mentioned means including a plurality of laterally extended legs having inner end portions secured to the peripheral edge of said grill element at spaced points therealong and outer end portions adapted to overlie and engage said upper end of said firepot element;
   (f) said grill element being rectangular in shape and in which said grill element and legs are in the nature of a tripod;
   (g) said inner end portion of two of the legs of said tripod being secured to said grill element adjacent one side edge one each at a different corner of said grill element;
   (h) said inner end portion of the third leg of said tripod being secured to the intermediate portion of the side edge of said grill element opposite said one side edge thereof.

2. The structure of claim 1 in which said two legs are formed as extensions of said one side edge and in which said third leg extends radially outwardly of said firepot element and forms a handle whereby said grill element may be rotated about the axis of said handle to position said grill element within said central opening in vertically spaced relation to the ground underlying same or alternately in overlying relation to said central opening.

3. The structure of claim 2 in further combination with flexible tie means extending between said third leg and said firepot element.

References Cited

UNITED STATES PATENTS

| | | | |
|---|---|---|---|
| 179,623 | 7/1876 | Sturdy | 126—30 |
| 1,437,739 | 12/1922 | Vernon | 126—29 |
| 2,314,791 | 3/1943 | Jones et al. | 126—25 |
| 2,487,605 | 11/1949 | Smith | 126—25 |
| 2,685,285 | 8/1954 | Bergeron | 126—25 |
| 3,327,699 | 6/1967 | Uden | 126—25 |

FREDERICK KETTERER, *Primary Examiner.*